US008645283B2

(12) United States Patent
Arrasvuori et al.

(10) Patent No.: US 8,645,283 B2
(45) Date of Patent: Feb. 4, 2014

(54) DETERMINATION OF EVENT OF INTEREST

(75) Inventors: Juha Arrasvuori, Tampere (FI); Jussi Holopainen, Tampere (FI); Hannu J. Korhonen, Kangasala (FI); Markus Montola, Helsinki (FI); Timo Nummenmaa, Tampere (FI)

(73) Assignee: Nokia Corporation, Espoo (FI)

( * ) Notice: Subject to any disclaimer, the term of this patent is extended or adjusted under 35 U.S.C. 154(b) by 962 days.

(21) Appl. No.: 12/313,833

(22) Filed: Nov. 24, 2008

(65) Prior Publication Data
US 2010/0130226 A1    May 27, 2010

(51) Int. Cl.
G06Q 99/00    (2006.01)

(52) U.S. Cl.
USPC .......................................................... 705/319

(58) Field of Classification Search
None
See application file for complete search history.

(56) References Cited

U.S. PATENT DOCUMENTS

| | | | |
|---|---|---|---|
| 6,771,818 B1 | 8/2004 | Krumm et al. | |
| 2005/0089223 A1 | 4/2005 | Krumm | |
| 2006/0178215 A1 | 8/2006 | Lehikoinen et al. | 463/39 |
| 2007/0294222 A1 | 12/2007 | Laurila et al. | 707/3 |
| 2008/0052349 A1* | 2/2008 | Lin | 709/203 |
| 2008/0186926 A1* | 8/2008 | Baio et al. | 370/338 |
| 2009/0061835 A1* | 3/2009 | Schmidt et al. | 455/414.2 |

FOREIGN PATENT DOCUMENTS

| | | |
|---|---|---|
| EP | 1 650 678 A1 | 4/2006 |
| EP | 1 659 518 A2 | 5/2006 |
| WO | WO 00/04711 | 1/2000 |
| WO | WO 2006/097907 A2 | 9/2006 |

OTHER PUBLICATIONS

A. Ferscha, C. Holzmann, and S. Oppl, "Context awareness for group interaction support," in MobiWac '04: Proceedings of the Second International Workshop on Mobility Management & Wireless Access Protocols, New York, NY, USA, ACM Press, 2004, pp. 88-97.*

(Continued)

Primary Examiner — Jonathan Ouellette
Assistant Examiner — Maame Ofori-Awuah
(74) Attorney, Agent, or Firm — Ditthavong, Mori & Steiner, P.C.

(57) ABSTRACT

A method includes receiving first media data from a plurality of persons; identifying first media data generated within a window of time at a certain location and associating the identified first media data with an occurrence of a first event; determining which persons of the plurality of persons were present at the occurrence of the first event; and storing information related to the first event in association with information identifying those persons determined to be present at the occurrence of the first event. The method further includes, in response to receiving further media data from a plurality of persons, determining if the further media data was generated within a window of time at a certain location; determining based at least in part of the stored information if the certain location associated with the further media data is the same as the certain location associated with the first media data, and if at least some of the persons from which the further media data is received are the same as the persons from which the first media data was received and, if so, declaring that a second event is occurring that is related to the first event; and sending a notification of the occurrence of the second event to those persons who were determined to be present at the occurrence of the first event and who are determined to not currently be present at the occurrence of the second event.

32 Claims, 5 Drawing Sheets

(56) References Cited

OTHER PUBLICATIONS

Ahern, Shane, Simon King, and Marc Davis. "MMM2: mobile media metadata for photo sharing." Proceedings of the 13th annual ACM international conference on Multimedia. ACM, 2005.*

Nair, Rahul, and Marc Davis. "Bluetooth pooling to enrich co-presence information." Adjunct Proceedings of the 7th International Conference on Ubiquitous Computing. 2005.*

International Search Report and Written Opinion, PCT/FI2009/050743, Dec. 11, 2009, pp. 1-19.

* cited by examiner

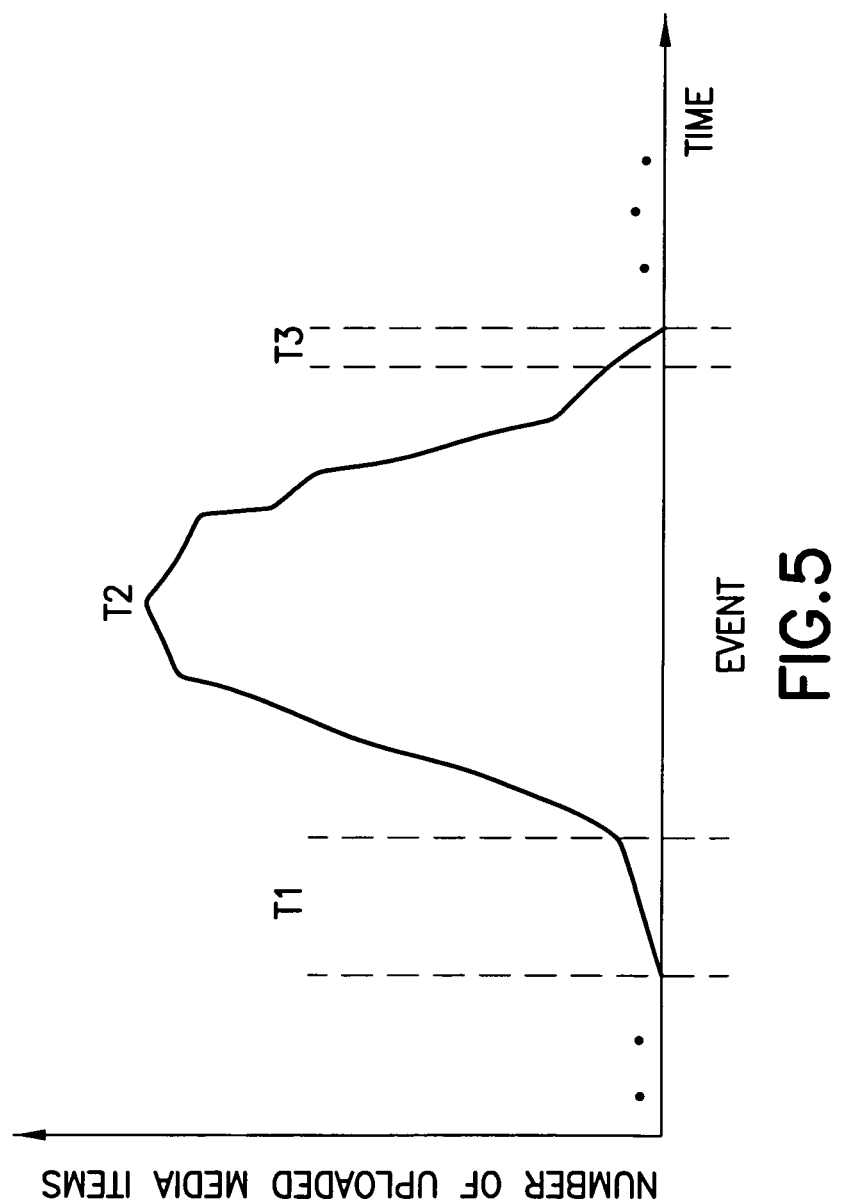

DETERMINATION OF EVENT OF INTEREST

TECHNICAL FIELD

The exemplary and non-limiting embodiments of this invention relate generally to communication systems, methods, devices and computer programs and, more specifically, relate to systems, methods, devices and computer programs to provide event notifications.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

As mobile communication devices have evolved they have been provisioned with increasingly useful capabilities such as location determining capabilities (e.g., using global positioning satellite (GPS) technology) and image capture (e.g., digital camera) technology.

It is desirable to fully exploit the capabilities of these various technologies in order to provide users with increasingly sophisticated communication devices and methods. In addition, it is desirable to fully exploit the capabilities of these various technologies in order to facilitate the establishment of user communities and groups linked by common interests and goals.

SUMMARY

In a first aspect thereof the exemplary embodiments of this invention provide a method comprises receiving first media data from a plurality of persons; identifying first media data generated within a window of time at a certain location and associating the identified first media data with an occurrence of a first event; determining which persons of the plurality of persons were present at the occurrence of the first event; and storing information related to the first event in association with information identifying those persons determined to be present at the occurrence of the first event.

In another aspect thereof the exemplary embodiments of this invention provide a computer readable memory medium that stores computer program instructions, the execution of the computer program instructions resulting in operations that comprise receiving first media data from a plurality of persons; identifying first media data generated within a window of time at a certain location and associating the identified first media data with an occurrence of a first event; determining which persons of the plurality of persons were present at the occurrence of the first event; and storing information related to the first event in association with information identifying those persons determined to be present at the occurrence of the first event.

In another aspect thereof the exemplary embodiments of this invention provide an apparatus that comprises a controller configured to operate with an input/output interface to receive first media data from a plurality of persons and to identify first media data that is generated within a window of time at a certain location, said controller being further configured to associate the identified first media data with an occurrence of a first event and to determine which persons of the plurality of persons were present at the occurrence of the first event and to store information related to the first event in association with information identifying those persons determined to be present at the occurrence of the first event.

BRIEF DESCRIPTION OF THE DRAWINGS

In the attached Drawing Figures:

FIG. 5 is an exemplary graph which plots a number of uploaded media events from a plurality of persons over time.

DETAILED DESCRIPTION

As employed herein an "event of interest" may be considered to be an occurrence or a happening that a particular person may find interesting. Events of interest may be assumed to occur at various times in various real-world locations.

One technical problem that is addressed by the exemplary embodiments of this invention is the provision of a service to determine that an event of interest has started to occur, and to notify any persons who may have an interest in the occurrence of the event.

Figure 1:
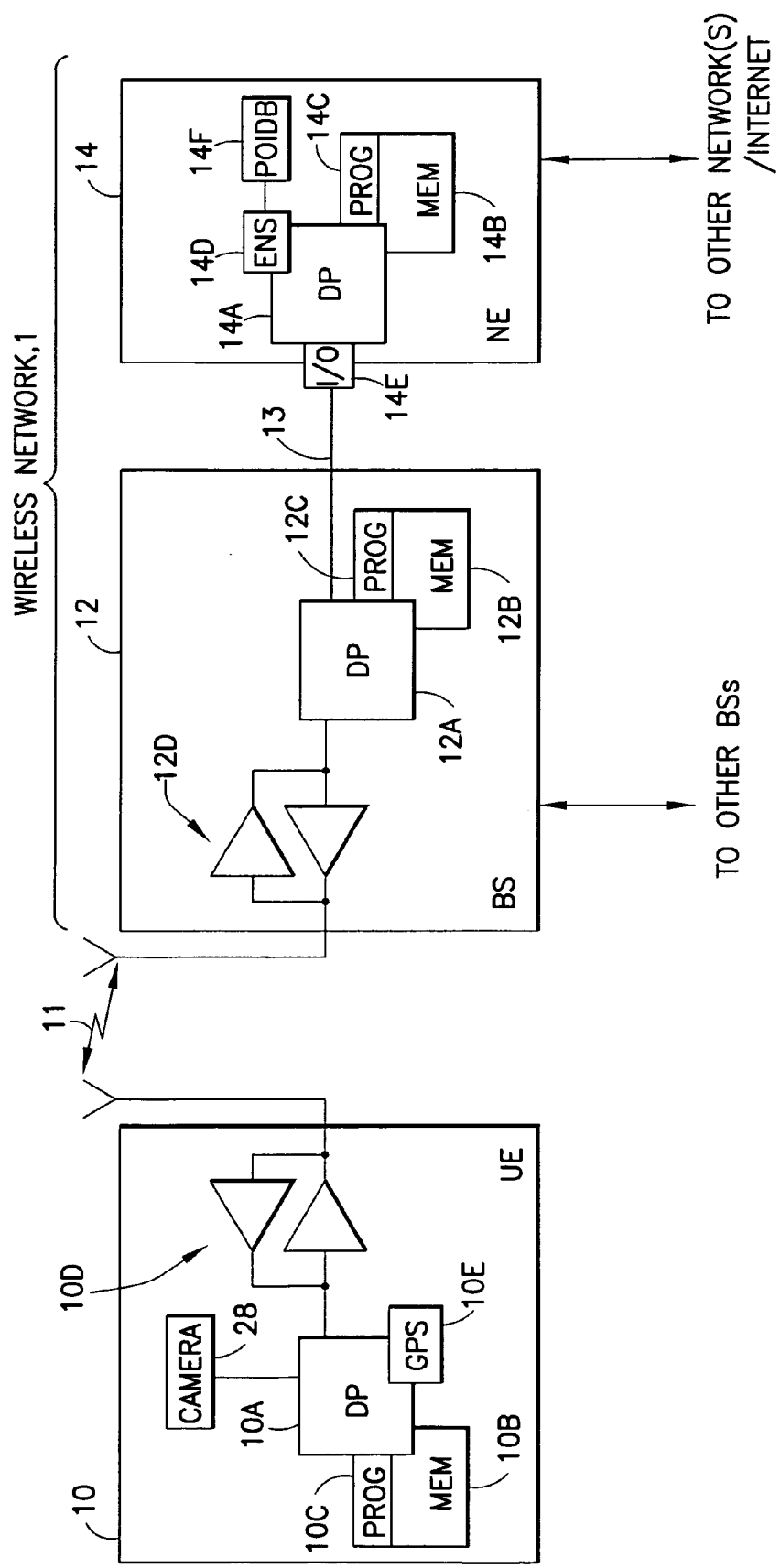
FIG. 1 shows a simplified block diagram of various electronic devices that are suitable for use in practicing the exemplary embodiments of this invention.

Before describing in further detail the exemplary embodiments of this invention, reference is made to FIG. 1 for illustrating a simplified block diagram of various electronic devices and apparatus that are suitable for use in practicing the exemplary embodiments of this invention. In FIG. 1 a wireless network 1 is adapted for communication over a wireless link 11 with an apparatus, such as a mobile communication device which may be referred to as a user equipment or UE 10, via a network access node, such as a Node B, or more simply a base station (BS) 12. The network 1 may include a network element (NE) 14 which may also provide connectivity with other networks, such as a telephone network and/or a data communications network (e.g., the internet). The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the BS 12 via one or more antennas. The BS 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas. The BS 12 is coupled via a data/control path 13 to the NE 14. The BS 12 may also be coupled to another BS via data/control path 15.

The NE 14 also includes a controller, such as a computer or a data processor (DP) 14A, a computer-readable memory medium embodied as a memory (MEM) 14B that stores a program of computer instructions (PROG) 12C.

At least the PROGs 10C and 14C are assumed to include program instructions that, when executed by the associated DP, enable the device to operate in accordance with the exemplary embodiments of this invention, as will be discussed below in greater detail.

That is, the exemplary embodiments of this invention may be implemented at least in part by computer software executable by the DP 10A of the UE 10 and/or by the DP 14A of the NE 14, or by hardware, or by a combination of software and hardware (and firmware).

For the purposes of describing the exemplary embodiments of this invention the UE 10 may be assumed to also include a position determining unit, such as a GPS receiver 10E, as well as an image capture device such as a camera 28 (see also FIG. 2) The NE 14 is assumed to include an event notification system or subsystem (ENS) 14D that operates in accordance with the exemplary embodiments of this invention as described in detail below. The ENS 14D may be implemented in whole or in part by the computer program instructions that form a part of the program 14C.

The NE 14 also includes an input/output (I/O) interface unit 14E for enabling data communications with other entities, including the UE 10.

Note that in other embodiments the NE 14 may not be a part of the wireless network 1, but may instead be a stand-alone server located remotely from the wireless network 1 and that is reachable through some suitable data communications network, such as the internet.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B, 12B, 14B may be of any type suitable to the local technical environment and may be implemented using any suitable data storage technology, such as semiconductor based memory devices, flash memory, magnetic memory devices and system's, optical memory devices and systems, fixed memory and removable memory. The DPs 10A, 12A, 14A may be of any type suitable to the local technical environment, and may include one or more of general purpose computers, special purpose computers, microprocessors, digital signal processors (DSPs) and processors based on a multicore processor architecture, as non-limiting examples.

Figure 2:
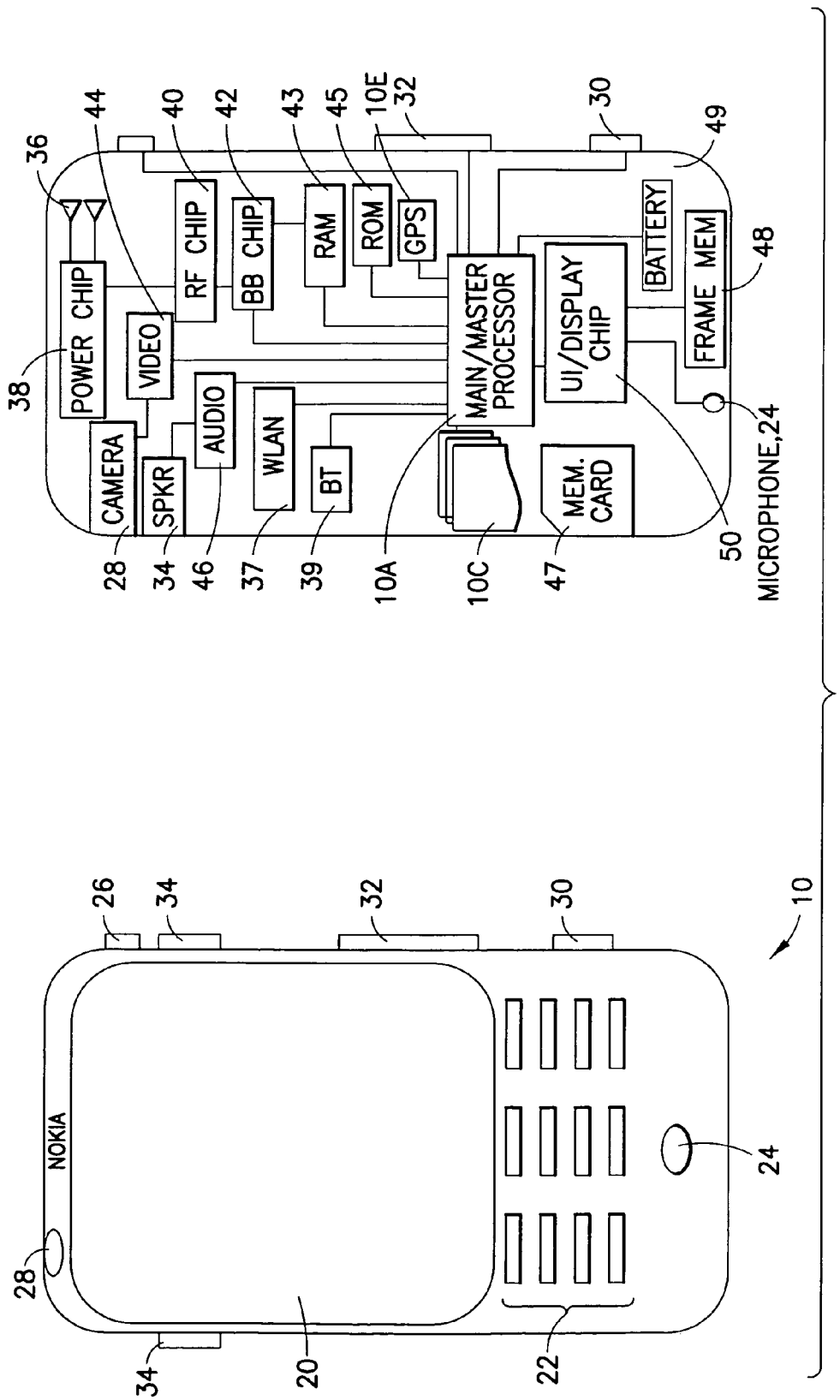
FIG. 2 shows a more particularized block diagram of a user equipment such as that shown at FIG. 1.

FIG. 2 illustrates in further detail an exemplary UE 10 in both plan view (left) and sectional view (right), and the invention may be embodied in one or some combination of those more function-specific components. In FIG. 2 the UE 10 has a graphical display interface 20 and a user interface 22 illustrated as a keypad but understood as also encompassing touch-screen technology at the graphical display interface 20 and voice-recognition technology received at a microphone 24. A power actuator 26 controls the device being turned on and off by the user. The exemplary UE 10 may have the camera 28 which is shown as being forward facing (e.g., for video calls) but may alternatively or additionally be rearward facing (e.g., for capturing images and video for local storage).

The camera 28 is controlled by a shutter actuator 30 and optionally by a zoom actuator 30 which may alternatively function as a volume adjustment for the speaker(s) 34 when the camera 28 is not in an active mode. The camera 28 may be capable of taking single pictures/images and/or video pictures/images. The GPS module/subsystem 10E shown in FIG. 1 is also shown in FIG. 2.

Within the sectional view of FIG. 2 are seen multiple transmit/receive antennas 36 that are typically used for cellular communication. The antennas 36 may be multi-band for use with other radios in the UE. The operable ground plane for the antennas 36 is shown by shading as spanning the entire space enclosed by the UE housing though in some embodiments the ground plane may be limited to a smaller area, such as disposed on a printed wiring board on which the power chip 38 is formed. The power chip 38 controls power amplification on the channels being transmitted and/or across the antennas that transmit simultaneously where spatial diversity is used, and amplifies the received signals. The power chip 38 outputs the amplified received signal to the radio frequency (RF) chip 40 which demodulates and downconverts the signal for baseband processing. The baseband (BB) chip 42 detects the signal which is then converted to a bit stream and finally decoded. Similar processing occurs in reverse for signals generated in the apparatus 10 and transmitted from it.

Signals going to and coming from the camera 28 pass through an image/video processor 44 which encodes and decodes the various image frames. A separate audio processor 46 may also be present controlling signals to and from the speakers 34 and the microphone 24. The graphical display interface 20 is refreshed from a frame memory 48 as controlled by a user interface chip 50 which may process signals to and from the display interface 20 and/or additionally process user inputs from the keypad 22 and elsewhere.

Certain embodiments of the UE 10 may also include one or more secondary radios such as a wireless local area network radio WLAN 37 and a Bluetooth™ radio 39, which may incorporate an antenna on the chip or be coupled to an antenna off the chip. Throughout the apparatus are various memories such as random access memory RAM 43, read only memory ROM 45, and in some embodiments there may be removable memory such as the illustrated memory card 47 on which the various programs 10C are stored. All of these components within the UE 10 are normally powered by a portable power supply such as a battery 49.

The processors 38, 40, 42, 44, 46, 50, if embodied as separate entities in a UE 10 or eNB 12, may operate in a slave relationship to the main processor 10A, 12A, which may then be in a master relationship to them. Embodiments of this invention may be disposed across various chips and memories as shown, or disposed within another processor that combines some of the functions described above for FIG. 2. Any or all of these various processors of FIG. 2 access one or more of the various memories, which may be on chip with the processor or separate from the chip having the processor. Similar function specific components that are directed toward communications over a network broader than a piconet (e.g., components 36, 38, 40, 42-45 and 47) may also be disposed in exemplary embodiments of the access node 12, which may have an array of tower mounted antennas rather than the two shown at FIG. 2.

Note that the various integrated circuits (e.g., chips 38, 40, 42, etc.) that were described above may be combined into a fewer number than described and, in a most compact case, may all be embodied physically within a single chip.

Describing now in further detail the exemplary embodiments of this invention, in general a system (e.g., the ENS 14D) analyzes uploaded media data or items from users, such as sets of geo-tagged photos originating from several users from about the same location and time. As employed herein media data or media content or a media item may be any type of user-generated data that may be captured by a user device, such as the UE 10, and may include, as non-limiting examples, image data (photographs and/or video) and/or audio data. As employed herein a geo-tagged photo may be considered to comprise image data having some type of geographical information associated therewith, where the geographical information is indicative of at least a location where the image was generated. Also associated with the geo-tagged photo is temporal information that is indicative of when the image was generated or uploaded.

In general, the location information and temporal information may be considered as comprising metadata associated with the uploaded media data or content or items, such as the image data. This meta-data could comprise other information as well, such as an identity of the person who took and/or uploaded the photo, and/or a description of the type of event depicted in the photo, as two non-limiting examples. Note that the metadata may be explicitly provided, such as by associated GPS location information, or it may be implicitly provided, such as the time of receipt of uploaded media data by the ENS 14D.

The system (e.g., the ENS 14D) determines that an event has occurred and takes note of which users were present at the event (e.g., based on the identities of those users who uploaded the photos to the system). At a next time that the ENS 14D begins to receive photos from one or more of the same users who were associated with the previous event, the ENS 14D may determine that a similar event of interest is occurring. The ENS 14D then determines which users who were present at the previous event are not present at the ongoing event. To those users the ENS 14D may send at least one photo from the previous event, and at least one photo from the ongoing event, along with a notification and further information (e.g., a map) concerning the ongoing event.

The ENS 14D analyzes photos taken by users and uploaded, such as to a photo sharing service. The photo sharing service may be a part of the ENS 14D, or it may be separate from the ENS 14D. The users may be considered to be registered users of the photo sharing service. If several users (e.g., at least three, or at least five) have taken one or more photos at a certain location and within a certain window of time, the ENS 14D determines that an event has occurred at that location. The ENS 14D keeps a record of those users who contributed photos from that event. The photos are geo-tagged, for example, by having the GPS receiver 10E associated with the output of the camera 28. In other embodiments the photos are geo-tagged by recording a Cell ID, or by associating WLAN base station information with the photos (as two non-limiting embodiments of location determining techniques).

In order to determine what type of event occurred the ENS 14D may send one or more of the photos to one or more of the users with a request to tag the photo(s) with some information descriptive of the event (e.g., "concert in the park") and thus aid the ENS 14D in determining the event type (e.g., a concert, carnival, art performance, sporting event, etc.). The ENS 14D may also utilize annotations made to the photos by the users who took and uploaded the photos. Thus, the system can eventually determine the theme or topic of the event.

After the event has occurred the ENS 14D may create a web page for the event, where the uploaded photos are displayed and, optionally, a list of event participants (or more precisely, of those who are registered to the service) is presented. Thus, even a registered user who did not upload any photos can later inform the ENS 14D that he was a participant in the event.

Figure 3:
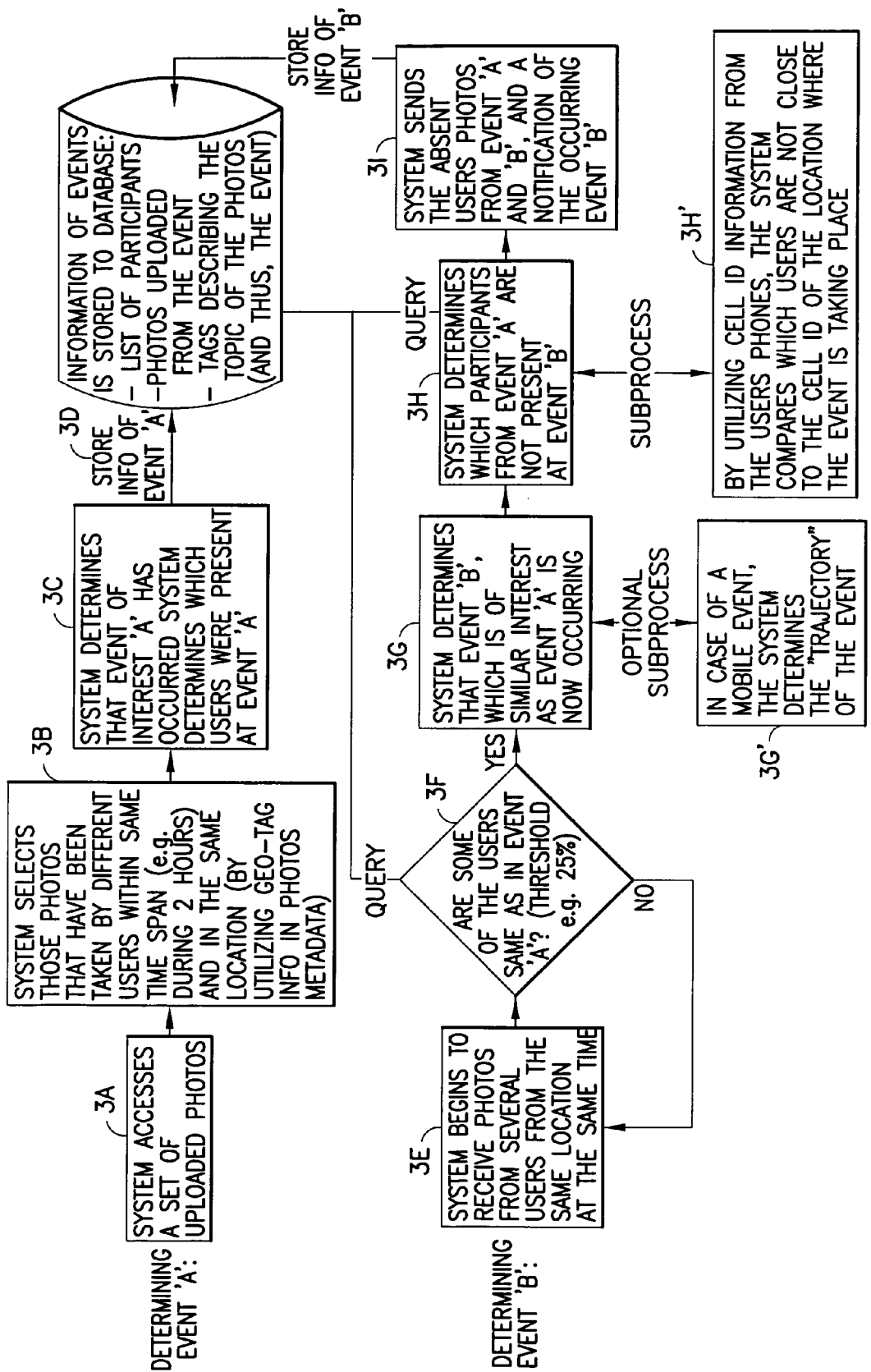
FIG. 3 is a logic flow diagram that illustrates the operation of a method, and a result of execution of computer program instructions embodied on a computer readable memory, in accordance with the exemplary embodiments of this invention.

The foregoing several paragraphs may be deemed as describing a determination that an event "A" has occurred. Referring to FIG. 3, the system (ENS 14D) accesses a set of uploaded photos (Step 3A). At Step 3B the ENS 14D selects those photos that have been taken by different users within the same time span (e.g., 2 hours) and at the same location, as indicated by geo-tag metadata. At Step 3C the ENS 14D determines that an event of interest has occurred (event "A"), and also determines which users were present and/or participated in the event of interest. The ENS 14D then stores (Step 3D) information descriptive of the event "A" into a database, which could be implemented as part of the memory 14B shown in FIG. 1, or as part of a remote memory. This information descriptive of the event "A" may include a list of participants known to the ENS 14D, the actual image data (photos), and the associated metadata, including location, time, event type, and any other information of interest to the event "A".

Still referring to FIG. 3, the system (ENS 14D) makes a subsequent determination of an occurrence of an event "B". This may occur as follows. At some time after event "A" the ENS 14D detects that some number of users begin to upload one or more photos having the same or similar geo-tag metadata (Step 3E). Note that the geo-tag metadata may indicate the same location as in the previously detected event (event "A"), but not necessarily so. At Step 3F the ENS 14D compares the persons uploading the photos to those persons who uploaded photos in the previously detected event (event "A"). If some certain number of the users now uploading photos are the same as those users who previously uploaded photos associated with event "A" (e.g., about 25% or more of the users are the same as one non-limiting example) the ENS 14D makes a determination that a similar event of interest is presently occurring (Step 3G).

At Step 3H the ENS 14D determines which users present at the previous event (event "A") are not present at the ongoing event (event "B"). This can be accomplished, for example, by a sub-process 3H accessing the UE 10 Cell IDs of those users to determine, if possible, their current locations. It may be assumed that when registering for this service that a user allows his Cell ID information to be tracked for this purpose. In other words, the ENS 14D makes a determination of which users who were present during event "A" are not currently present during the ongoing event "B". At Step 3I the ENS 14D may send to the absent users at least one photo from the previous event, and at least one photo from the ongoing event. This can be accomplished in conjunction with sending a message, such as "Remember how it was last time? Here is a similar event happening RIGHT NOW! See you there!" In addition, a map pinpointing the location of the event "B" may be provided with the notification. In this manner the absent users learn about the ongoing event "B", and can choose whether to participate in the event "B".

If the ENS 14D determines that some of the absent users are currently located too far away from the location of the ongoing event (e.g., in another country), then it may not send the event notification to those users.

A special case of an event may be referred to for convenience as a "mobile event", in other words, an event that changes location during the time that the event occurs. Such events can include, for example, a carnival that travels from city to city, and a cruise.

Thus, an optional sub-process 3G may be provided to define the "trajectory" of the mobile event, in other words, a method for the ENS 14D to predict in which direction a particular ongoing event is moving. Information about the location is included in the event notification, and update event notifications may be sent to absent users as the event unfolds.

The sub-process that determines the "trajectory" of the mobile event utilizes some combination of the location coordinates of the uploaded photos, the topic of the event (as defined by, for example, metadata tags of the photos), maps, and point of interest databases. It is likely that there is a thematic similarity between the topic of the mobile event and the location towards which it is moving.

For example, assume that the event of interest is a carnival that was located in city A last week and is currently located in city B. Based on possibly historical data related to the carnival's locations in a previous year and/or published (possibly on-line) schedule information, the ENS 14D can predict that the carnival will be in city C next week, and the event notification can include this information.

The use of the exemplary embodiments of this invention clearly facilitates and enhances the operation of media sharing services by providing a social context.

Note that the notification of an event may be sponsored by a third party.

Furthermore, the exemplary embodiments of this invention define an indirect and convenient method of having invitations sent to events by the taking and uploading of photos and other media content.

These exemplary embodiments may be utilized, as one example, as an add-on feature to a photo service with social networking features.

Note that while discussed above in the context of photographs taken with the digital camera 28 of the user equipment, the exemplary embodiments of this invention may be used as well with uploaded videos and video clips that do or do not include an audio track.

Note further that, depending on the capabilities of the ENS 14D, image processing may also be used on uploaded image data to facilitate the event recognition process. For example, the image data may be examined to locate and identify objects that would aid in identifying the event type (e.g., one or more persons standing on a structure identified as being part of a ship may aid in identifying the event type as a cruise, or a structure identified as being a Ferris wheel may aid in identifying the event type as an amusement park or a carnival). In addition, text appearing on any located banners or signs in the image may be used (e.g., a banner reading "County Fair"). In addition, any audio content associated with an uploaded media item may be used in combination with voice/sound recognition methods to determine something about the event type (e.g., the presence and/or identity of a performer). Note that the audio content may be a recording made of the event itself, or it may be an audio annotation made by the user, either alone or in combination with the generation of other media content. For example, an uploaded video may include an audio track where the user identifies or describes an event or occurrence shown in the video, and a speech recognition algorithm at the ENS 14D may be used to process the audio track to extract the event-related information. In this case, and by example, the video data may be considered to be the uploaded media data or item or content, while the accompanying audio track may be considered to be, or to form a part of, the related metadata.

It should also be noted that predetermined time windows may be associated with the event recognition process, or dynamic time windows may be used. In other words, a density and number of uploaded media items from a certain location may be used to determine when an event of interest has begun. Statistically, it can be determined when the number of uploaded media items from a location increases in such a way that an event can be seen to begin, occur, and end. Consider the exemplary graph shown in FIG. 5, which plots a number of uploaded media items from a plurality of persons over time. During time T1 there is a gradual increase in the number of uploaded media items from a population of users. This is followed an abrupt and significant increase and a correspondingly abrupt and significant decrease during time T2, followed by a gradual decrease in uploaded media items during time T3. Based on this information the ENS 14D is enabled to detect the beginning of an event of interest during T1, to confirm the detection during the initial part of T2, and also detect and confirm the end of the event during the end of T2 and during time T3. Note in this case that the durations of times T1, T2 and T3, and thus the duration of the time window, are not predetermined, and may vary significantly from event to event. Note as well that the durations of times T1, T2 and T3, and thus the overall duration of the time window, for a first event of interest of a certain type may not be the same as the durations of times T1, T2 and T3, and thus the overall duration of the time window, for a second, subsequently occurring event of interest of the certain type.

The size of a location where a particular event of interest occurs may be taken into account by the ENS 14D in order to be able to filter out uploaded media items and other media content captured near the event of interest but not related to it. For example, the spatial "enclosure" of the event of interest may be approximated from the spread in the GPS locations of the user devices uploading the media content.

As such, it can be appreciated that the ENS 14D is enabled to determine both the temporal and the spatial dimensions of an event of interest based on uploaded media content and associated metadata.

It is also within the scope of these exemplary embodiments for a user to subscribe to a past event from the ENS 14D server, even if the user did not participate in the event. In this manner the user may be able to receive an indication of an occurrence of a second, event of interest of similar type as the first event of interest, even though the user was not present during the first event of interest. The user is also enabled to unsubscribe from a particular event of interest type.

In addition to photos and videos, and as was noted above, other media items and content that can be considered by the ENS 14D to determine the type of event of interest include, but are not limited to, sounds (e.g., specific spoken slogans), specific pieces of music, and text (e.g., short message service (SMS) messages) created and captured during an occurrence of an event. This multimedia content may be made available by the ENS 14D service for recalling a past event and/or for advertising a new event.

It is also within the scope of these exemplary embodiments for the ENS 14D server to have access to a point of interest database (POI DB 14F in FIG. 1) in order to determine what types of locations (e.g., tourist attractions, concert halls, city parks, etc.) are at or near to the coordinates where a suspected event of interest may be taking place. For example, in a case where the uploaded media content is from a location of a tourist attraction, the ENS 14D may seek to obtain more data in order to determine if an event of interest is actually in progress, or if the uploaded media content is typical for this particular location (e.g., is it just another typical day in front of the Eiffel tower?). Also, calendar information may be used to determine the event type, for example, there are specific events of interest that occur during national and religious holidays. In general, metadata obtained from various different sources can be used in combination to determine an event type.

Note that while the POI DB 14F is shown in FIG. 1 as being co-located with the ENS 14D, in other embodiments it may be located elsewhere and communication may be made through the internet or some other data communication network.

Note also that when determining the type of event of interest the ENS 14D may also consider the number of, and the recipients of, call and SMS communications from the event participants during the event. For example, the number of calls made to emergency services may be considered.

Based on the foregoing it should be apparent that the exemplary embodiments of this invention provide a method, apparatus and computer program(s) to perform an event notification function.

Figure 4:
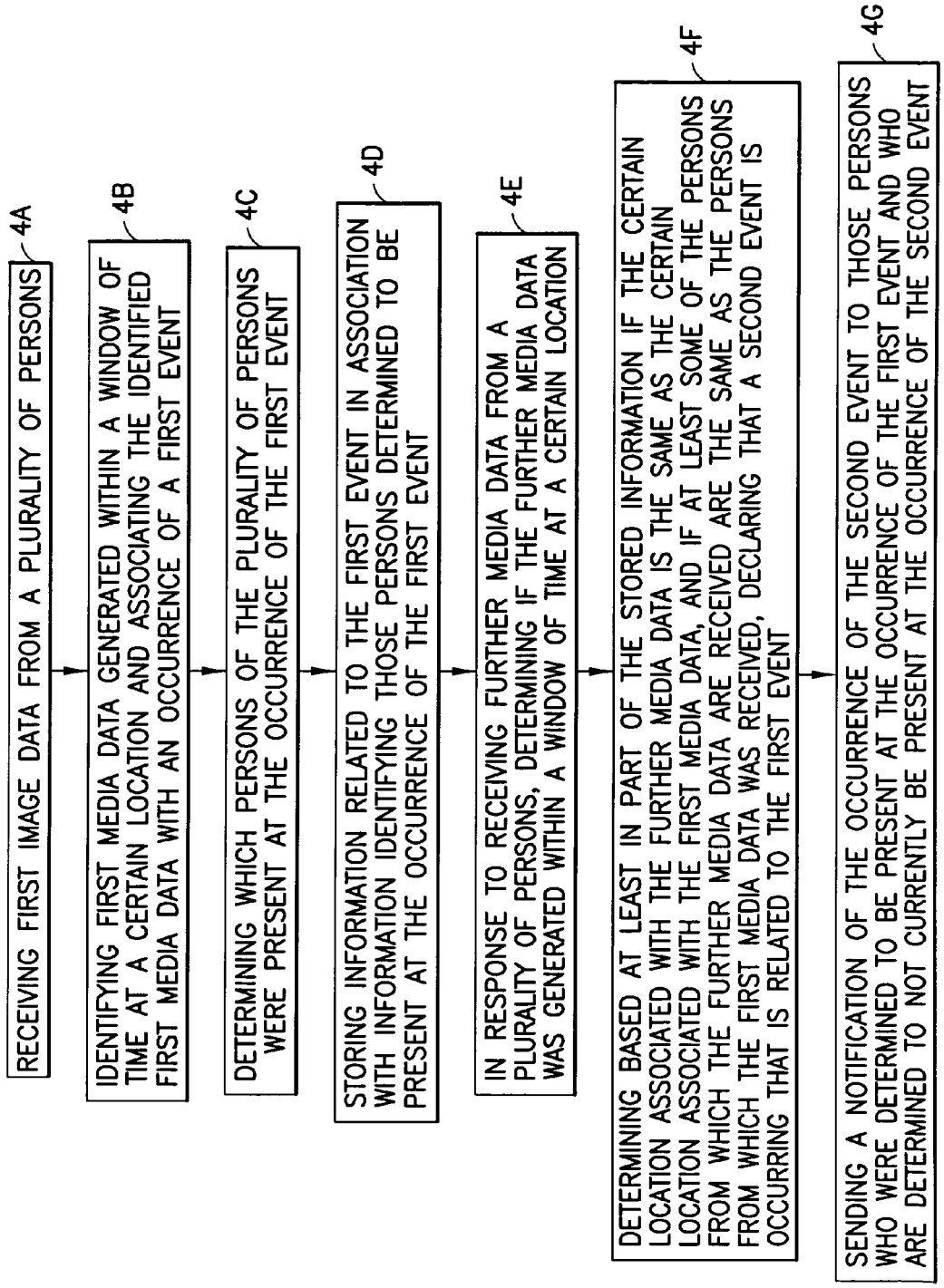
FIG. 4 is a second logic flow diagram that illustrates the operation of the method, and the result of execution of computer program instructions embodied on the computer readable memory, further in accordance with the exemplary embodiments of this invention.

FIG. 4 is a logic flow diagram that illustrates the operation of a method, and a result of execution of computer program instructions, in accordance with the exemplary embodiments of this invention. In accordance with these exemplary embodiments a method performs, at Block 4A, a step of receiving first media data from a plurality of persons. The method further performs, at Block 4B, a step of identifying first media data generated within a window of time at a certain location and associating the identified first media data with an occurrence of a first event. The method further performs, at Block 4C, a step of determining which persons of the plurality of persons were present at the occurrence of the first event. The method further performs, at Block 4D, a step of storing information related to the first event in association with information identifying those persons determined to be present at the occurrence of the first event. The method further performs, at Block 4E, a step of, in response to receiving further media data from a plurality of persons, determining if the further media data was generated within a window of time at a certain location. The method further performs, at Block 4F, a step of determining based at least in part of the stored information if the certain location associated with the further media data is the same as the certain location associated with the first media data, and if at least some of the persons from which the further media data are received are the same as the persons from which the first media data was received, declaring that a second event is occurring that is related to the first event. The method further performs, at Block 4G, a step of sending a notification of the occurrence of the second event to those persons who were determined to be present at the occurrence of the first event and who are determined to not currently be present at the occurrence of the second event.

The various blocks shown in FIGS. 3 and 4 may be viewed as method steps, and/or as operations that result from operation of computer program code, and/or as a plurality of coupled logic circuit elements constructed to carry out the associated function(s).

The exemplary embodiments of this invention also pertain to an apparatus that comprises means for receiving first media data from a plurality of persons; means for identifying first media data generated within a window of time at a certain location and associating the identified first media data with an occurrence of a first event; means for determining which persons of the plurality of persons were present at the occurrence of the first event; means for storing information related to the first event in association with information identifying those persons determined to be present at the occurrence of the first event; means, responsive to receiving further media data from a plurality of persons, for determining if the further media data was generated within a window of time at a certain location; means for determining based at least in part of the stored information if the certain location associated with the further media data is the same as the certain location associated with the first media data, and if at least some of the persons from which the further media data is received are the same as the persons from which the first media data was received and, if so, for declaring that a second event is occurring that is related to the first event; and means for sending a notification of the occurrence of the second event to those persons who were determined to be present at the occurrence of the first event and who are determined to not currently be present at the occurrence of the second event.

In this apparatus the means for identifying and determining may consider metadata associated with the media data, where the metadata comprises information descriptive of a location where the media data was generated, and information descriptive of a time that the media data was generated. The means for sending may send at least one stored image from the first event and at least one image related to the occurring second event to those persons determined to not currently be present at the occurrence of the second event, and who are located such that they could attend to the second event.

In this apparatus at least the second event may be a mobile event, and the apparatus may further comprise means for predicting a future location of the occurring second event. In this case the sending means may include at least one of a current location and the predicted future location of the second event.

These exemplary embodiments also pertain to user apparatus that is configured to enable the user to subscribe and unsubscribe to the event notification service provided by the ENS 14D, and to receive and present event notifications from the ENS 14D as described above.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have not been described in the context of any specific type of wireless communication system, it should be appreciated that the exemplary embodiments of this invention are not limited for use with any one particular type of wireless communication system, and that they may be used to advantage in any type of wireless communication system including, but not limited to, an evolved UTRAN (LTE) system and further releases thereof, GSM/EDGE systems, WCDMA systems, and also WLAN systems as non-limiting examples.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

The invention claimed is:

1. A method, comprising:
    causing, at least in part, an identification, by a processor, of first media data from a first plurality of persons; causing, at least in part, an association of the first media data with an occurrence of a first event;
    causing, at least in part, an identification of second media data from a second plurality of persons;
    determining an occurrence of a second event related to the first event based, at least in part, on at least one common person between the first plurality of persons and the second plurality of persons; and
    causing, at least in part, a transmission of a notification of the second event to at least one person of the first plurality of persons not among the second plurality of persons.

2. The method of claim 1, further comprising: determining a window of time, a location, or a combination thereof associated with the media data, the first event or a combination thereof; and
    determining the at least one person based, at least in part, on the window of time, the location, the first media data, the second media data, or a combination thereof.

3. The method of claim 2, wherein at least the second event is a mobile event, and further comprising determining to predict a future location of the occurring second event.

4. The method of claim 2, wherein the determination of the occurrence of the second event is based, at least in part, on a determination that the second media data was generated at the location.

5. The method of claim 1, wherein at least some of the first media data is received through a wireless communication network, further comprising:
    causing, at least in part, a storing of information related to the first event in association with information identifying the first plurality of persons.

6. The method of claim 1, wherein at least some of the first media data is generated using a camera that comprises part of a mobile communication device.

7. The method of claim 1, wherein the identification of the first media data is based, at least in part, on metadata associated with the media data.

8. The method of claim 7, wherein the metadata comprises information descriptive of a location where the media data was generated, and information descriptive of a time that the media data was generated.

9. The method of claim 7, wherein the metadata comprises information descriptive of an identification of a type of event.

10. The method of claim 1, wherein the transmission of the notification comprises sending at least one stored image from the first event and at least one image related to the occurring second event.

11. The method of claim 1, wherein the transmission of the notification comprises determining a current location of these persons determined to not currently be present at the occurrence of the second event.

12. The method of claim 1, wherein the transmission of the notification comprises including at least one of a current location and a predicted future location of the second event.

13. A method of claim 1, further comprising:
    determining persons present at the occurrence of the first event based, at least in part, on persons in receipt of the first media data after the occurrence of the first event.

14. A non-transitory computer-readable storage medium carrying one or more sequences of one or more instructions which, when executed by one or more processors, cause an apparatus to at least perform the following steps:
    causing, at least in part, an identification of first media data from a first plurality of persons;
    causing, at least in part, an association of the first media data with an occurrence of a first event;
    causing, at least in part, an identification of second media data from a second plurality of persons;
    determining an occurrence of a second event related to the first event based, at least in part, on at least one common person between the first plurality of persons and the second plurality of persons; and
    causing, at least in part, a transmission of a notification of the second event to at least one person of the first plurality of persons not among the second plurality of persons.

15. The non-transitory computer-readable storage medium of claim 14, wherein the apparatus is caused to further perform:
    determining a window of time, a location, or a combination thereof associated with the media data, the first event or a combination thereof; and determining the at least one person based, at least in part, on the window of time, the location, the first media data, the second media data, or a combination thereof.

16. The non-transitory computer-readable storage medium of claim 15, wherein at least the second event is a mobile event, and the apparatus is caused to further perform:
    determining to predict a future location of the occurring second event.

17. The non-transitory computer-readable storage medium of claim 14, wherein at least some of the first media data is generated using a camera that comprises part of a mobile communication device, and the apparatus is caused to further perform:
    causing, at least in part, a storing of information related to the first event in association with information identifying the first plurality of persons.

18. The non-transitory computer-readable storage medium of claim 14, wherein the identification of the first media data is based, at least in part, on metadata associated with the media data.

19. The non-transitory computer-readable storage medium of claim 18, wherein the metadata comprises information descriptive of a location where the media data was generated, and information descriptive of a time that the media data was generated.

20. The non-transitory computer-readable storage medium of claim 18, wherein the metadata comprises information descriptive of an identification of a type of event.

21. The non-transitory computer-readable storage medium of claim 14, wherein the transmission of the notification comprises sending at least one stored image from the first event and at least one image related to the occurring second event.

22. The non-transitory computer-readable storage medium of claim 14, wherein the transmission of the notification comprises determining a current location of these persons determined to not currently be present at the occurrence of the second event.

23. The non-transitory computer-readable storage medium of claim 14, wherein the transmission of the notification comprises including at least one of a current location and a predicted future location of the second event.

24. An apparatus comprising:
at least one processor; and
at least one memory including computer program code for one or more programs,
the at least one memory and the computer program code configured to, with the at least one processor, cause the apparatus to perform at least the following, cause, at least in part, an identification of first media data from a first plurality of persons;
cause, at least in part, an association of the first media data with an occurrence of a first event;
cause, at least in part, an identification of second media data from a second plurality of persons;
determine an occurrence of a second event related to the first event based, at least in part, on at least one common person between the first plurality of persons and the second plurality of persons; and
cause, at least in part, a transmission of a notification of the second event to at least one person of the first plurality of persons not among the second plurality of persons.

25. The apparatus of claim 24, wherein the apparatus is further caused to:
determine a window of time, a location, or a combination thereof associated with the media data, the first event or a combination thereof and
determine the at least one person based, at least in part, on the window of time, the location, the first media data, the second media data, or a combination thereof.

26. The apparatus of claim 25, wherein at least the second event is a mobile event, wherein the apparatus is further caused to:
determine to predict a future location of the occurring second event, and when sending the notification to include at least one of a current location and the predicted future location of the second event.

27. The apparatus of claim 24, wherein at least some of the first media data is generated using a camera that comprises part of a mobile communication device, and the apparatus is further caused to:
cause, at least in part, a storing of information related to the first event in association with information identifying the first plurality of persons.

28. The apparatus of claim 24, wherein the identification of the first media data is based, at least in part, on metadata associated with the first media data.

29. The apparatus of claim 28, wherein the metadata comprises information descriptive of a location where the media data was generated, and information descriptive of a time that the media data was generated.

30. The apparatus of claim 28, wherein the metadata comprises information descriptive of an identification of a type of event.

31. The apparatus of claim 24, wherein the transmission of the notification comprises sending at least one stored image from the first event and at least one image related to the occurring second event.

32. The apparatus of claim 24, wherein the transmission of the notification comprises determining a current location of these persons determined to not currently be present at the occurrence of the second event.

* * * * *